United States Patent [19]

Naitoh et al.

[11] Patent Number: 4,888,666
[45] Date of Patent: Dec. 19, 1989

[54] ROLL TYPE SOLID ELECTROLYTIC CAPACITOR

[75] Inventors: Kazumi Naitoh; Yoshiaki Arakawa, both of Yokohama, Japan

[73] Assignees: Showa Denko Kabushiki Kaisha; Nippon Chemi-Con Corporation, both of Tokyo, Japan

[21] Appl. No.: 51,787

[22] Filed: May 20, 1987

[30] Foreign Application Priority Data

| May 20, 1986 | [JP] | Japan | 61-113521 |
| May 20, 1986 | [JP] | Japan | 61-113538 |
| May 21, 1986 | [JP] | Japan | 61-114935 |
| May 22, 1986 | [JP] | Japan | 61-116087 |
| Jul. 16, 1986 | [JP] | Japan | 61-167146 |
| Jul. 21, 1986 | [JP] | Japan | 61-171059 |
| Dec. 27, 1986 | [JP] | Japan | 61-313405 |
| Dec. 27, 1986 | [JP] | Japan | 61-310686 |
| Dec. 27, 1986 | [JP] | Japan | 61-310688 |

[51] Int. Cl.$^4$ .............................................. H01G 9/02
[52] U.S. Cl. ................................... 361/512; 29/570.1
[58] Field of Search ............... 361/433, 433 W, 433 S, 361/433 A, 433 C, 512; 29/25.42, 570.1; 252/62.2

[56] References Cited

U.S. PATENT DOCUMENTS

| 2,408,910 | 10/1946 | Burnham | 361/433 W X |
| 3,066,247 | 11/1962 | Robinson | 361/433 S |
| 3,258,826 | 7/1966 | Boone et al. | 29/25.42 |
| 3,301,704 | 1/1967 | Zind | 361/433 A X |
| 3,320,494 | 5/1967 | Riley | 361/433 S |
| 3,443,164 | 5/1969 | Hazzard | 361/433 W |
| 3,483,438 | 12/1969 | Sharbaugh | 252/62.2 X |
| 3,498,861 | 3/1970 | Namikata et al. | 29/570.1 X |
| 3,619,387 | 11/1971 | Mindt et al. | 361/433 C X |
| 3,674,629 | 7/1972 | Roos | 361/313 X |
| 3,869,652 | 3/1975 | Maillot | 361/433 |
| 4,464,701 | 8/1984 | Roberts et al. | 361/313 |
| 4,648,010 | 3/1987 | Naitoh et al. | 361/433 S |

Primary Examiner—Donald A. Griffin
Attorney, Agent, or Firm—Sughrue, Mion, Zinn, Macpeak & Seas

[57] ABSTRACT

Disclosed is a solid electrolytic capacitor having a roll-form capacitor element. The capacitor element has a coated structure comprising a valve metal positive electrode substrate having a dielectric oxide layer on the surface thereof, a semiconductor layer formed on the dielectric oxide layer and an electroconductive layer formed on the semiconductor layer.

9 Claims, 3 Drawing Sheets

ROLL TYPE SOLID ELECTROLYTIC CAPACITOR

BACKGROUND OF THE INVENTION

1. Field of the Invention

The present invention relates to a solid electrolytic capacitor More particularly, it relates to a roll type solid electrolytic capacitor

2. Description of the Prior Art

In electrolytic capacitors, a film-forming metal capable of forming an insulating oxide film, that is, a so-called valve metal, such as aluminum, tantalum, niobium or titanium, is used as a positive electrode. An oxide film layer is formed on the surface of the valve metal by anodic oxidation or the like and this oxide film layer is utilized as a dielectric material. A negative electrode is arranged on the outside of the oxide film layer with an electrolyte layer interposed therebetween, and thus a capacitor is constructed.

As the electrolyte, there can be mentioned a liquid electrolyte formed by dissolving an inorganic or organic acid or a salt thereof in water or a polar solvent and a solid electrolyte composed of an electroconductive or semiconductive inorganic oxide or organic substance such as manganese dioxide, lead dioxide or a tetracyanoquinodimethane complex salt. A capacitor comprising the latter electrolyte is called a solid electrolytic capacitor.

Various shapes have been proposed for the valve metal positive electrode substrate. A roll form capacitor formed by winding a sheet-form substrate into the form of a roll is advantageous in that the capacitance per unit volume is large. However, in a capacitor of the type where two electrode foils having a paper separator interposed therebetween are wound, such as a conventional electrolytic capacitor comprising a liquid electrolyte or a capacitor comprising a TCNQ salt as the solid electrolyte as disclosed in Japanese Unexamined Pat. Publication No 58-17,609, reduction of the volume is limited because of the special structure thereof.

Furthermore, if a liquid electrolyte or TCNQ salt is used, the electroconductivity is low and generally $10^{-1}$ $S\cdot cm^{-1}$ or less, and characteristics of the capacitors, such as the loss coefficient (tan $\delta$) and the impedance, are apt to be adversely influenced.

SUMMARY OF THE INVENTION

It is a primary object of the present invention to solve the problems of the conventional solid electrolytic capacitors and provide a solid electrolytic capacitor having good capacitor performances, in which the effect of reducing the size and volume is much higher than in the conventional capacitors.

In accordance with the present invention, there is provided a roll type solid electrolytic capacitor comprising a capacitor element which comprises a valve metal positive electrode substrate having a dielectric oxide layer on the surface thereof, a semiconductor layer formed on the dielectric oxide layer and an electroconductive layer formed on the semiconductor layer and wound in the form of a roll.

This roll type solid electrolytic capacitor is prepared according to a process comprising the steps of forming a semiconductor layer on a dielectric oxide layer of a sheet-form valve metal positive electrode substrate having the dielectric oxide layer on the surface thereof and the step of forming an electroconductive layer on the semiconductor layer, wherein the step of winding the valve metal positive electrode substrate into the form of a roll is placed (i) before the step of forming the semiconductor layer, (ii) between the step of forming the semiconductor layer and the step of forming the electroconductive layer, or (iii) after the step of forming the electroconductive layer.

In accordance with another aspect of the present invention, there is provided a process for the preparation of a solid electrolytic capacitor, which comprises forming a semiconductor layer composed mainly of lead dioxide or lead dioxide and lead sulfate on a dielectric oxide layer of a sheet-form valve metal positive electrode substrate having the dielectric oxide layer on the surface thereof to form a semiconductor layer-formed positive electrode substrate, winding the semiconductor layer-formed substrate together with a sheet-form negative electrode or separator into the form of a roll so that the semiconductor layer-formed substrate and the negative electrode or separator are alternately superposed, or superposing a plurality of sheet-form negative electrodes or separators and a plurality of the semiconductor layer-formed substrates so that the semiconductor layer-formed substrate and the negative electrodes or separators are alternately superposed, to form a capacitor element, and forming a semiconductor layer composed mainly of lead dioxide or lead dioxide and lead sulfate in spaces between every two adjacent wound layers of the capacitor element.

DETAILED DESCRIPTION OF THE PREFERRED EMBODIMENTS

Any metal having a valve action, such as aluminum, tantalum, niobium, titanium or alloy thereof, can be used as the valve metal substrate as the positive electrode. Of these valve metals, aluminum is especially preferred. In the present invention, a sheet-form positive electrode is wound in the form of a roll. In the instant specification and appended claims, the term "sheet-form" is used in a broad sense to include a foil, a film, a sheet, a tape and a ribbon.

The dielectric oxide layer formed on the surface of the positive electrode substrate may be either a layer of an oxide of the positive electrode per se formed in the surface portion of the positive electrode substrate, or a layer of other dielectric oxide formed on the surface of the positive electrode substrate. A layer composed of an oxide of the positive electrode valve metal per se is preferred. In each case, any known oxide layer-forming methods can be adopted. For example, where an aluminum foil is used as the positive electrode substrate, if the surface of the aluminum foil is electrochemically etched and the aluminum foil is electrochemically treated in an aqueous solution of boric acid and ammonium borate, an oxide layer composed of a dielectric aluminum oxide is formed on the aluminum foil as the positive electrode substrate. A positive electrode lead line is connected to the valve metal positive electrode substrate by caulking, high frequency bonding or the like before or after formation of the dielectric oxide layer.

Figure 1:
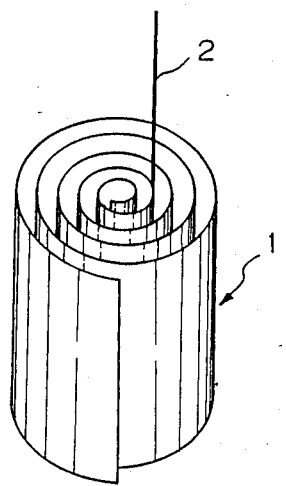
FIG. 1 is a perspective view illustrating a solid capacitor element wound in the form of a roll.

The sheet-form valve metal positive electrode substrate is wound into the form of a roll directly or after formation of the semiconductor layer or formation of the semiconductor layer and the electroconductive layer to form a roll-form electrolytic capacitor element 1 as shown in FIG. 1. In FIG. 1, reference numeral 2 represents a positive electrode lead terminal.

The method for winding the valve metal positive electrode substrate into the form of a roll is not particularly critical. For example, the known method for fabricating a roll-form element comprising negative electrode and positive electrode foils used for a conventional electrolytic capacitor comprising a liquid electrolyte can be utilized for winding the positive electrode alone in the present invention. Such factors as the winding number, the winding diameter nd the winding pitch can be optionally determined and are not particularly critical. Where the winding is carried out before formation of the semiconductor layer, preferably the valve metal positive electrode substrate is wound while spaces between adjacent wound layers are taken into consideration so that the semiconductor layer and electroconductive layer are formed in a good condition on the oxide layer.

If the dielectric oxide layer formed in advance is cracked during the winding operation, the re-forming or aging operation can be performed. The re-forming operation can be performed according to any known methods. For example, the above-mentioned electrochemical treatment in an aqueous solution of boric acid and ammonium borate for the aluminum foil can be adopted.

Figure 2:
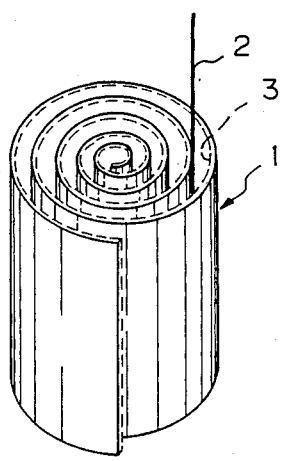
FIG. 2 is a perspective view illustrating a capacitor element wound together with a separator in the form of a roll.

When the sheet-form valve metal positive electrode substrate or the substrate having the electroconductive layer or the semiconductor layer and electroconductive layer formed on the valve metal positive electrode substrate is wound into the form of a roll, a separator can be wound together with the substrate. FIG. 2 shows a roll-form capacitor element 1 in which a separator 3 is jointly wound and a positive electrode lead terminal 2 is attached. As the separator, there may be used woven fabrics, non-woven fabrics and paper sheets composed of glass fibers, carbon fibers, rayon fibers, nylon fibers or polypropylene fibers.

In the present invention, the kind of the semiconductor or the method for forming the semiconductor layer is not particularly critical. In order to enhance such characteristics as the loss coefficient (tan δ) and impedance in the capacitor, preferably a semiconductor composed mainly of a metal oxide such as lead dioxide, manganese dioxide or tin dioxide is deposited by a known method such as thermal decomposition, electrochemical precipitation or chemical precipitation.

A layer composed mainly of lead dioxide or lead dioxide and lead sulfate is especially advantageously used as the semiconductor layer in the present invention.

As the method for forming a semiconductor layer composed mainly of lead dioxide or lead dioxide and lead sulfate, there can be mentioned a chemical deposition method and an electrochemical deposition method.

As the chemical deposition method, there can be mentioned, for example, a method in which the semiconductor is chemically deposited from a solution containing a lead-containing compound and an oxidant.

As the lead-containing compound, there can be mentioned lead-containing compounds in which a lead atom is coordination-bonded or ion-bonded to a chelate-forming compound such as oxine, acetylacetone, pyromeconic acid, salicylic acid, alizarin, polyvinyl acetate, a porphyrin compound, a crown compound or a cryptate compound, and lead citrate, lead acetate, basic lead acetate, lead chloride, lead bromide, lead perrchlorate, lead chlorate, lead sulfate, lead silicon hexafluoride, lead bromate, lead borofluoride, lead acetate hydrate and lead nitrate. An appropriate lead-containing compound is selected according to the solvent used for the reaction mother liquid. A mixture of two or more of the foregoing lead-containing compounds may be used.

The concentration of the lead-containing compound in the reaction mother liquid is in the range of from the concentration giving a saturation solubility to 0.05 mole/l, preferably from the concentration giving a saturation solubility to 0.1 mole/l, especially preferably from the concentration giving a saturation solubility to 0.5 mole/l. If the concentration of the lead-containing compound in the reaction mother liquid is lower than 0.05 mole/l, a solid electrolytic capacitor having a good performance cannot be obtained. If the concentration of the lead-containing compound in the reaction mother liquid exceeds the saturation solubility, no advantage is obtained by addition of the excessive amount of the lead-containing compound.

As the oxidant, there can be mentioned, for example, quinone, chloranil, pyridine-N-oxide, dimethyl sulfoxide, chromic acid, potassium permanganate, selenium oxide, mercury acetate, vanadium oxide, sodium chlorate, ferric chloride, hydrogen peroxide, benzoyl peroxide, calcium hypochlorite, calcium chlorite, calcium chlorate and calcium perchlorate. An appropriate oxidant is selected according to the solvent. A mixture of two or more of the foregoing oxidants may be used.

Preferably the oxidant is used in an amount of 0.1 to 5 moles per mole of the lead-containing compound. If the amount of the oxidant is larger than 5 moles per mole of the lead-containing compound, no economical advantage is obtained, and if the amount of the oxidant is smaller than 0.1 mole per mole of the lead-containing compound, a solid electrolytic capacitor having a good performance cannot be obtained.

As the means for forming a semiconductor layer composed mainly of lead dioxide, there can be adopted, for example, a method in which a solution containing the lead-containing compound is mixed with a solution containing the oxidant to prepare a reaction mother liquid and a foil laminate is immersed in the reaction mother liquid to chemically deposit lead dioxide on the foil laminate.

As the electrochemical deposition method, there can be mentioned a method previously proposed by us, in which lead dioxide is deposited by electrolytic oxidation in an electrolyte containing a lead ion at a high concentration (see Japanese patent application No. 61-26,962).

The electrolyte used for forming a semiconductor layer composed mainly of lead dioxide by electrolytic oxidation is an aqueous solution containing a lead ion or an organic solvent solution containing a lead ion. In order to improve the ion electroconductivity of the electrolyte, a known electrolytic substance may be incorporated into the electrolyte.

As the organic solvent used for formation of the organic solvent solution, any solvent capable of dissolving therein the above-mentioned compound giving a lead ion seed can be used. For example, there can be mentioned ethyl alcohol, glycerol, benzene, dioxane and chloroform. A mixture of two or more of the foregoing organic solvents may be used. Furthermore, an organic solvent having a compatibility with water may be used in the form of a mixture with water.

The lead ion concentration in the electrolyte is 0.2 mole/l to the concentration giving a saturation solubility, preferably from 0.5 mole/l to the concentration giving a saturation solubility, especially preferably from 0.9 mole/l to the solution giving a saturation solubility. If the concentration of the lead ion exceeds the level giving a saturation solubility, no advantage is obtained by an addition of an excessive amount of the lead ion. If the lead ion concentration is lower than 0.2 mole/l, because of a too low concentration of the lead ion in the electrolyte, a semiconductor layer of lead dioxide formed by electrolytic oxidation does not sufficiently adhere to the oxide layer of the positive electrode substrate, and only a solid electrolytic capacitor having a very small capacitance and a large loss coefficient is obtained.

Electrolytic oxidation can be performed according to a known method such as a constant current method, a constant voltage method or a pulse method or by adopting the constant current method and constant voltage method alternately. Known electrolytic apparatus and operation procedures may be adopted for electrolytic oxidation. The time and temperature of electrolytic oxidation are changed according to the kind of the positive electrode substrate, the substantial area of the oxide film, the kind of the lead ion seed and the electrolytic conditions and cannot be simply defined. Preferably the time and temperature are decided based on the results of preliminary experiments.

If the semiconductor layer is constructed by a layer composed mainly of lead dioxide acting inherently as the semiconductor and lead sulfate acting as an insulating substance, the leak current value of the capacitor can be reduced. On the other hand, the incorporation of lead sulfate reduce the electroconductivity of the semiconductor layer, and therefore, the loss coefficient value is increased, but a performance much higher than that of the conventional solid electrolytic capacitor can be maintained. Namely, if the semiconductor layer is formed of a mixture of lead dioxide and lead sulfate, a good capacitor performance can be maintained within such a broad composition range that the amount of lead dioxide is 10 to 100 parts by weight and the amount of lead sulfate is up to 90 parts by weight. In order to obtain a good balance between the leak current value and the loss coefficient value, preferably the semiconductor layer is composed of a mixture comprising 20 to 50% by weight, especially 25 to 35% by weight, of lead dioxide and 80 to 50% by weight, especially 75 to 65% by weight, of lead sulfate. If the content of lead dioxide is lower than 10% by weight, the electroconductivity is reduced and the loss coefficient value is increased, and a sufficient capacitance is not manifested.

The semiconductor layer composed mainly of lead dioxide and lead sulfate can be prepared, for example, by chemical deposition using an aqueous solution containing a lead ion and a persulfate ion as the reaction mother liquid. An oxidant free of a persulfate ion may be added to the aqueous solution.

The lead ion concentration in the mother liquid is from the concentration giving a saturation solubility to 0.05 mole/l, preferably from the concentration giving a saturation solubility to 0.1 mole/l, especially preferably from the concentration giving a saturation solubility to 0.5 mole/l. If the lead ion concentration exceeds the concentration giving a saturation solubility, no advantage is obtained by an addition of an excessive amount of the lead ion. If the lead ion concentration is lower than 0.05 mole/l, because of a too low lead ion concentration in the mother liquid, the frequency of deposition of the semiconductor should be increased.

The persulfate ion concentration in the mother liquid is such that the molar ratio of the persulfate ion to the lead ion is from 5 to 0.05. If this molar ratio exceeds 5, the unreacted persulfate ion is left and the manufacturing cost is increased. If the molar ratio is lower than 0.05, the unreacted lead ion is left and the electroconductivity is reduced.

As the compound giving a lead ion seed, there can be mentioned, for example, lead citrate, lead perchlorate, lead nitrate, lead acetate, basic lead acetate, lead chlorate, lead sulfamate, silicon lead hexafluoride, lead bromate, lead chloride and lead bromide. A mixture of two or more of these compounds giving a lead ion seed may be used. As the compound giving a persulfate ion seed, there can be mentioned, for example, potassium persulfate, sodium persulfate and ammonium persulfate. A mixture of two or more of these compounds giving a persulfate ion seed may be used.

As the oxidant, there can be mentioned, for example, hydrogen peroxide, calcium hypochlorite, calcium chlorite, calcium chlorate and calcium perchlorate.

In the present invention, the electroconductive layer on the semiconductor layer may be formed, for example, by solidification of an electroconductive paste, plating and metal vacuum deposition. As the electroconductive paste, there are preferably used a silver paste, a copper paste, a nickel paste, an aluminum paste and a carbon paste. These pastes may be used singly or in the form of mixtures of two or more thereof. If at least two pastes are used, they may be used in the form of a mixture, or in the form of superposed independent layers. After the electroconductive paste is applied, the paste is allowed to stand in air or is heated, whereby the paste is solidified.

As the plating, there can be mentioned nickel plating, copper plating and aluminum plating. As the metal to be vacuum-deposited, there can be mentioned aluminum and copper.

The common negative electrode terminal may be attached by using an electroconductive paste or soldered onto the electroconductive layer.

In accordance with one modified embodiment of the present invention, there is provided a solid electrolytic capacitor comprising a capacitor element comprising a sheet-form valve metal positive electrode substrate having a dielectric oxide layer on the surface thereof and a semiconductor layer composed mainly of lead dioxide or lead dioxide and lead sulfate and formed on the dielectric oxide layer, wherein the substrate is wound together with a negative electrode or separator into the form of a roll or a plurality of said substrates and a plurality of negative electrodes or separators are alternately superposed and wound in the form of a roll. In preparing this solid electrolytic capacitor, preferably the step of forming semiconductor layer is conducted two times, that is, before and after the step of winding the substrate together with the negative electrode or separator into the form of a roll or superposing a plurality of the substrates and plurality of negative electrodes or separators alternately.

This two-staged process for forming the semiconductor layer will now be described.

When a metal sheet which has been etched for an increase of the surface area is wound into a roll or superposed as the valve metal positive electrode substrate, since the adjacent metal sheet layers are contacted, it is difficult to form a lead dioxide layer into a deep portion of an etching pit, and even if the frequency of immersion in the lead-containing aqueous solution is increased, it is still difficult to sufficiently form the lead dioxide layer.

Figure 4:
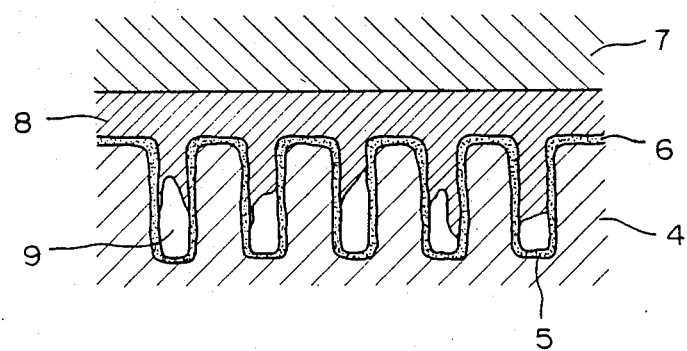
FIG. 4 is a sectional view illustrating, in comparison with FIG. 3, the state where a semiconductor layer is formed according to another process.

FIG. 4 illustrates the state where a valve metal positive electrode substrate 4 and a negative electrode 7 are wound into a roll or superposed alternately, and a semiconductor layer 8 is formed in a space portion between the positive electrode substrate 4 and the negative electrode 7. The lead ion-containing aqueous solution is required to permeate in the interior of an etching pit 5 through the space between the positive electrode substrate 4 and the negative electrode 7, but since this permeation distance is long, the aqueous solution fails to reach the bottom of the etching pit 5 and a vacant portion is inevitably formed in the bottom of the etching pit 5, with the result that the contact area between the dielectric oxide film layer 6 and the semiconductor layer 8 is often insufficient.

Figure 5:
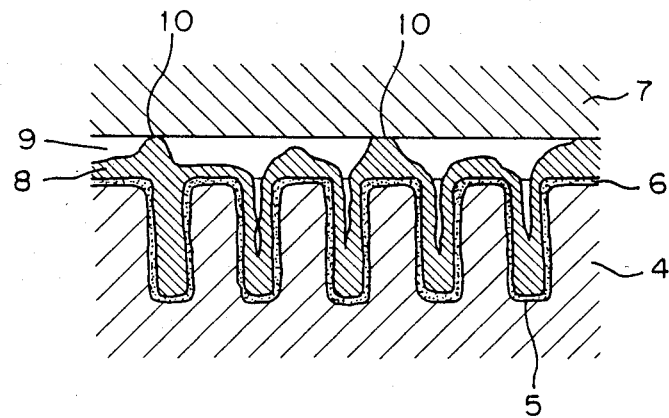
FIG. 5 is a sectional view illustrating, in comparison with FIG. 3, the state where a semiconductor layer is formed according to still another process; and, FIG. 6 is a sectional view illustrating the state where a semiconductor layer is formed according to another preferred process of the present invention.

When the valve metal positive electrode 4 is wound into a roll or superposed after formation of the semiconductor layer 8, a state shown in FIG. 5 is readily formed. Namely, since the semiconductor 8 is formed before the negative electrode 7 is superposed on the positive electrode substrate, the lead ion-containing aqueous solution permeates even to the interior of the etching pit 5 and a sufficient contact is attained between the dielectric oxide film layer 6 and the semiconductor layer 8. However, since the contact of the semiconductor layer 8 with the semiconductor layer 7 is effected only at a contact portion 10 on a part of the surface of the semiconductor layer 8, no sufficient electric conduction is obtained between the semiconductor layer 8 and the negative electrode 7.

Figure 3:
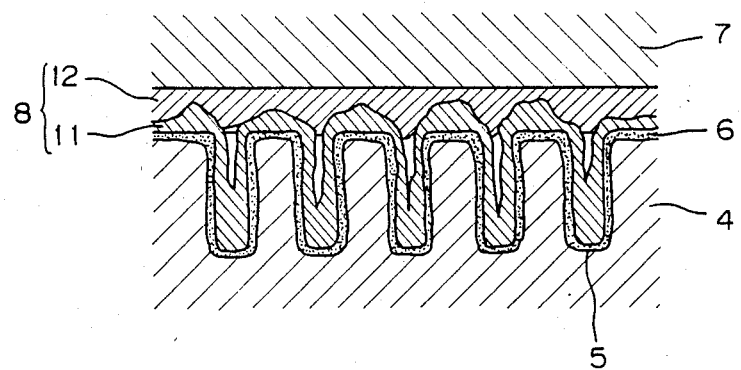
FIG. 3 is a sectional view illustrating the state where a semiconductor layer is formed according to a preferred process of the present invention.

FIG. 3 illustrates the state where the semiconductor 8 is formed before and after winding into a roll or superposing together with the negative electrode. Namely, by formation of a first semiconductor layer 11, a sufficient contact thereof with the dielectric oxide film layer 6 in the interior of the etching pit 5 of the positive electrode substrate 4 is obtained, and by formation of a second semiconductor layer 12, a sufficient contact thereof with the negative electrode 7, is obtained.

Figure 6:
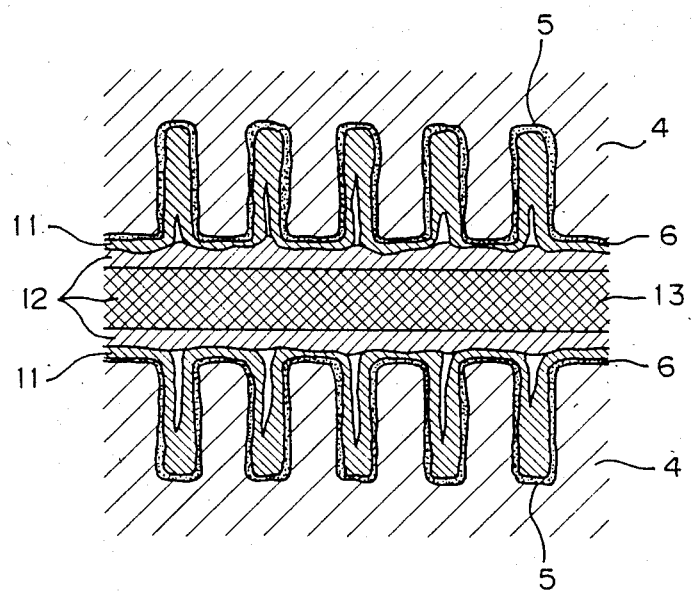

FIG. 6 illustrates the state where the semiconductor layer 12 is formed before and after winding into a roll or superposing together with a porous separator 13. By formation of a first semiconductor layer 11, a sufficient contact thereof with the dielectric oxide film layer 6 in the interior of the etching pit 5 of the positive electrode substrate 4 is obtained, and by formation of a second semiconductor layer 12, spaces between layers of the positive substrate 4 are filled with the semiconductor layer 8 through the porous separator 13.

Where formation of the semiconductor layer is conducted in two stages, lead ion-containing aqueous solutions differing in the concentration or viscosity can be used according to the difference of the shape in vacant portions to be filled. Each of the treatment for forming the first semiconductor layer 11 and the treatment for forming the second semiconductor layer may be conducted once or a plurality of times.

The present invention will now be described in detail with reference to the following examples.

EXAMPLE 1

The surface of an aluminum foil having a length of 10 cm and a width of 0.5 cm was electrochemically etched by an alternating current by using the aluminum foil as the positive electrode. Then, a positive electrode terminal was caulked to the etched aluminum foil and a positive electrode lead line was connected thereto. Then, the aluminum foil was electrochemically treated in an aqueous solution of boric acid and ammonium borate to form an aluminum oxide layer whereby an etched and formed aluminum foil for a low voltage (about 1.0 $\mu F/cm^2$) was obtained. The formed foil was then wound into the form of a roll and the obtained roll-form element was subjected to re-formation in the above-mentioned aqueous solution of boric acid and ammonium borate. Subsequently, the roll-form element was immersed in an aqueous solution containing 1 mole/l of lead acetate, and a dilute aqueous solution containing hydrogen peroxide in an amount of 0.5 mole per mole of lead acetate was added to the above aqueous solution. The roll-form element was allowed to stand for 1 hour, and a layer of lead dioxide percipitated on the roll-form element was washed with water and dried under a reduced pressure at 100° C. The roll-form element having the lead dioxide layer bonded thereto was immersed in a silver paste bath, taken up and air-dried. The solidified silver paste layer was formed on the lead dioxide layer of the roll-form element. A copper line was connected as a negative electrode lead to the roll-form element by a silver paste, and the roll-form element was sealed with a resin to form a solid electrolytic capacitor.

EXAMPLE 2

A roll-form element prepared in the same manner as described in Example 1 was immersed, except the positive electrode lead line, in an aqueous solution containing 1.9 mole/l of lead nitrate. Electrolytic oxidation was carried out at a constant electric current for 10 hours by using carbon as the negative electrode to form a lead dioxide layer on the roll-form element. The roll-form element was taken out, washed with water and dried under a reduced pressure at 100° C. for 1 hour. The post treatments were carried out in the same manner as in Example 1 to form a solid electrolytic capacitor.

EXAMPLE 3

A solid electrolytic capacitor was prepared in the same manner as described in Example 1 except that manganese acetate was used instead of lead acetate to form a semiconductor layer of manganese dioxide.

COMPARATIVE EXAMPLE 1

By using the same etched and formed aluminum foil as used in Example 1, an electrolytic capacitor comprising a liquid electrolyte was prepared by known procedures. More specifically, an element comprising a positive electrode foil (the above-mentioned etched and formed aluminum foil) having a terminal attached thereto, a positive electrode foil having a terminal attached thereto and a separator was wound into the form of a roll. The roll-form element was impregnated with a liquid electrolyte comprising ethylene glycol and ammonium adipate and contained in an outer casing formed of aluminum. An opening was closed with a rubber sealer to form a roll type electrolytic capacitor.

COMPARATIVE EXAMPLE 2

By using the same etched and formed aluminum foil as used in Example 1, a solid electrolytic capacitor comprising an electroconductive layer of a TCNQ salt was prepared according to the process disclosed in Japanese Unexamined Pat. Publication No. 58-17,609. More specifically, a complex salt of isopropyl quinoline with TCNQ was heat-fused in an outer casing formed of aluminum. A roll-form element having a positive electrode foil having a terminal attached thereto, a negative electrode foil having a terminal attached thereto and a separator was preliminarily heated and immersed in the melt of the TCNQ complex salt. The melt was promptly solidified by cooling. The roll-form element was sealed with a resin to form a roll type electrolytic capacitor.

The properties of the capacitors prepared in Examples 1 through 3 and Comparative Examples 1 and 2 are shown in Table 1.

TABLE 1

| | Capacitance (μF) | tan δ (%)[1] | Impedance (Ω)[2] | Size of capacitor[3] | ESR (Ω)[4] |
|---|---|---|---|---|---|
| Example 1 | 6.8 | 9.4 | 2.7 | 0.7 | 18 |
| Example 2 | 6.5 | 8.6 | 2.6 | 0.7 | 18 |
| Example 3 | 6.0 | 9.8 | 2.7 | 0.7 | 21 |
| Comparative Example 1 | 9.8 | 15.1 | 25.7 | 1 | 24 |
| Comparative Example 2 | 5.8 | 10.2 | 2.8 | 0.9 | 24 |

Note
[1] measured at 120 Hz
[2] measured at 10 khz
[3] relative value calculated based on the size of the capacitor of Comparative Example 1 regarded as 1
[4] equivalent series resistance value (determined at 120 Hz)

EXAMPLE 4

The surface of an aluminum foil having a length of 10 cm and a width of 0.5 cm was electrochemically etched by an alternating current by using the aluminum foil as the positive electrode. A positive electrode terminal was caulked to the etched aluminum foil and a positive electrode lead line was connected thereto. The etched aluminum foil was electrochemically treated in an aqueous solution of boric acid and ammonium borate to form an aluminum oxide layer whereby an etched and formed aluminum foil for a low voltage (about 1.0 $\mu F/cm^2$) was obtained. The formed aluminum foil was wound into a roll-form element and the formation treatment was conducted again in the above-mentioned aqueous solution of boric acid and ammonium borate.

An aqueous solution of lead acetate trihydrate having a lead acetate trihydrate concentration of 3.8 mole/l was mixed with an aqueous solution of ammonium persulfate having an ammonium persulfate concentration of 4.0 mole/l to obtain a reaction mother liquid. The above-mentioned roll-form element was immersed in the reaction mother liquid and was allowed to stand at 80° C. for 20 minutes. The semiconductor layer precipitated on the roll-form element was washed with water to remove the unreacted substance, and the roll-form element was dried under a reduced pressure at 100° C. for 1 hour. By mass analysis, X-ray analysis and infrared spectrum analysis, it was confirmed that the formed semiconductor layer was composed of lead dioxide and lead sulfate and the content of lead dioxide was about 25% by weight.

Then, the roll-form element having the semiconductor layer composed of lead dioxide and lead sulfate was immersed in a silver paste bath, taken out and air-dried. The solidified silver paste layer was formed on the semiconductor layer of the wound foil. A copper line was connected as a negative electrode lead to the roll-form element by a silver paste, and the element was sealed with a resin to obtain a solid electrolytic capacitor.

EXAMPLE 5

A solid electrolytic capacitor was prepared in the same manner as described in Example 4 except that the concentration of ammonium persulfate was changed to 0.4 mole/l at the step of forming the semiconductor layer. It was confirmed that the semiconductor layer was composed of lead dioxide and lead sulfate and the content of lead dioxide was about 35% by weight.

EXAMPLE 6

A solid electrolytic capacitor was prepared in the same manner as described in Example 4 except that aqueous hydrogen peroxide was added at a concentration of 0.05 mole/l to the reaction mother liquid at the step of forming the semiconductor layer. It was confirmed that the semiconductor layer was composed of lead dioxide and lead sulfate and the content of lead dioxide was about 50% by weight.

EXAMPLE 7

A solid electrolytic capacitor was prepared in the same manner as described in Example 4 except that aqueous hydrogen peroxide was added at a concentration of 0.2 mole/l to the reaction mother liquid at the step of forming the semiconductor layer. It was confirmed that the semiconductor layer was composed of lead dioxide and lead sulfate and the content of lead dioxide was about 94% by weight.

COMPARATIVE EXAMPLE 3

A solid electrolytic capacitor was prepared in the same manner as described in Example 4 except that an aqueous solution of lead citrate having a lead citrate concentration of 0.7 mole/l was used instead of the aqueous solution of lead acetate trihydrate having a lead acetate trihydrate concentration of 3.8 mole/l and the ammonium persulfate concentration in the aqueous solution of ammonium persulfate was changed to 4.8 mole/l. It was confirmed that the semiconductor was composed of lead dioxide and lead sulfate and the content of lead dioxide was about 5% by weight.

The properties of the capacitors prepared in Examples 4 through 7 and Comparative Example 3 are shown in Table 2. For comparison, also the results of Comparative Examples 1 and 2 are shown.

TABLE 2

| | Capacitance (μF) | tan δ (%)*1 | Impedance (Ω)*2 | Leak Current (μA)*3 | Size of capacitor*4 |
|---|---|---|---|---|---|
| Example 4 | 7.0 | 6.8 | 2.3 | 0.06 | 0.7 |
| Example 5 | 6.7 | 6.2 | 2.3 | 0.07 | 0.7 |
| Example 6 | 6.1 | 5.8 | 2.6 | 0.09 | 0.7 |
| Example 7 | 5.6 | 5.5 | 2.9 | 0.12 | 0.7 |
| Comparative Example 1 | 9.8 | 15.1 | 25.7 | 0.07 | 1 |
| Comparative Example 2 | 5.8 | 10.2 | 2.8 | 0.08 | 0.9 |
| Comparative Example 3 | 5.6 | 10.4 | 4.7 | 0.05 | 0.7 |

Note
*1 measured at 120 Hz
*2 measured at 10 kHz
*3 measured at 20 V
*4 relative value calculated based on the size of the capacitor of Comparative Example 1 regarded as 1

EXAMPLE 8

The surface of an aluminum foil having a length of 5 cm and a width of 0.3 cm was electrochemically etched by an alternating current by using the aluminum foil as the positive electrode. Then, a positive electrode terminal was caulked to the etched aluminum foil and the etched aluminum foil was electrochemically treated in an aqueous solution of boric acid and ammonium borate to form a dielectric aluminum oxide layer whereby an etched and formed aluminum foil for a low voltage (about 10 μF/10 cm$^2$) was obtained. The formed foil was then immersed, except the positive electrode terminal, in an aqueous solution containing 1.0 mole/l of lead acetate trihydrate, and a dilute aqueous solution containing 0.5 mole per mole of lead acetate trihydrate was added. The foil was allowed to stand for 1 hour to form a lead dioxide layer on the dielectric layer. The lead dioxide layer was washed with water and dried under reduced pressure, and a carbon paste was coated and dried on the lead dioxide layer. Then, a silver paste was coated on the carbon paste layer and dried at room temperature, and the coated foil was wound into the form of a roll to form a capacitor element. A negative electrode terminal was formed on the solidified silver paste by soldering, and the capacitor element was sealed with a resin to obtain a roll type solid electrolytic capacitor.

EXAMPLE 9

The same etched and formed aluminum foil as used in Example 8 was immersed, except the positive electrode lead line, in an aqueous solution containing 1.9 mole/l of lead nitrate. The foil was subjected to electrolytic oxidation at a constant current for 10 hours by using carbon as the negative electrode to form a lead dioxide layer on the dielectric layer. The lead dioxide layer was sufficiently washed with water and dried under reduced pressure at 100° C. for 1 hour. The post treatments were carried out in the same manner as described in Example 8 to obtain a roll type solid electrolytic capacitor.

EXAMPLE 10

A roll type solid electrolytic capacitor comprising a semiconductor layer of manganese dioxide was prepared in the same manner as described in Example 8 except that manganese acetate was used instead of lead acetate trihydrate.

COMPARATIVE EXAMPLE 4

A roll type electrolytic capacitor was prepared in the same manner as described in Comparative Example 1 except that the same positive electrode foil (etched and formed aluminum foil) as used in Example 8 was used.

COMPARATIVE EXAMPLE 5

A roll type electrolytic capacitor was prepared in the same manner as described in Comparative Example 2 except that the same positive electrode foil (etched and formed aluminum foil) as used in Example 8 was used.

The results obtained in Examples 8 through 10 and Comparative Examples 4 and 5 are shown in Table 3.

TABLE 3

| | Capacitance (μF) | tan δ (%)* | Size of capacitor* | ESR (Ω)* |
|---|---|---|---|---|
| Example 8 | 2.3 | 1.8 | 0.7 | 10 |
| Example 9 | 2.0 | 1.7 | 0.7 | 12 |
| Example 10 | 1.8 | 1.9 | 0.7 | 14 |
| Comparative Example 4 | 2.9 | 2.3 | 1 | 12 |
| Comparative Example 5 | 1.6 | 2.0 | 0.9 | 17 |

Note
*1 measured at 120 Hz
*2 relative value calculated based on the size of the capacitor of Comparative Example 4 regarded as 1
*3 equivalent series resistance value

EXAMPLE 11

The surface of an aluminum foil having a length of 5 cm and a width of 0.3 cm was electrochemically etched by an alternating current by using the aluminum foil as the positive electrode. Then, a positive electrode terminal was caulked to the etched aluminum foil and the etched aluminum foil was electrochemically treated in an aqueous solution of boric acid and ammonium borate to form a dielectric aluminum oxide layer whereby an etched and formed aluminum foil for a low voltage (about 10 μF/10 cm²) was obtained.

A reaction mother liquid was formed by mixing an aqueous solution containing 3.8 mole/l of lead acetate trihydrate with an aqueous solution containing 4.0 mole/l of ammonium persulfate. The etched and formed aluminum foil was immersed, except the positive electrode terminal, in this reaction mother liquid and allowed to stand at 80° C. for 20 minutes. The semiconductor layer precipitated on the dielectric layer was washed with water to remove the unreacted substances and then dried under a reduced pressure at 100° C. for 1 hour. By mass analysis, X-ray analysis and infrared spectrum analysis, it was confirmed that the formed semiconductor layer was composed of lead dioxide and lead sulfate and the content of lead dioxide was about 25% by weight.

Then, a carbon paste was coated and dried on the semiconductor layer, and a silver paste was further coated and dried at room temperature. The coated aluminum foil was then wound into the form of a roll to form a capacitor element. A negative electrode terminal was attached onto the solidified silver paste by soldering and the capacitor element was sealed with a resin to obtain a roll type solid electrolytic capacitor.

EXAMPLE 12

A roll type solid electrolytic capacitor was prepared in the same manner as described in Example 11 except that the concentration of ammonium persulfate was changed to 0.4 mole/l at the step of forming the semiconductor layer. It was confirmed that the semiconductor layer was composed of lead dioxide and lead sulfate and the content of lead dioxide was about 35% by weight.

EXAMPLE 13

A roll type solid electrolytic capacitor was prepared in the same manner as described in Example 11 except that aqueous hydrogen peroxide was added at a concentration of 0.05 mole/l to the reaction mother liquid at the step of forming the semiconductor layer. It was confirmed that the semiconductor layer was composed of lead dioxide and lead sulfate and the content of lead dioxide was about 50% by weight.

EXAMPLE 14

A roll type solid electrolytic capacitor was prepared in the same manner as described in Example 11 except that aqueous hydrogen peroxide was added at a concentration of 0.2 mole/l to the reaction mother liquid at the step of forming the semiconductor layer. It was confirmed that the semiconductor layer was composed of lead dioxide and lead sulfate and the content of lead dioxide was about 94% by weight.

COMPARATIVE EXAMPLE 6

A roll type solid electrolytic capacitor was prepared in the same manner as described in Comparative Example 3 except that the same positive electrode foil (etched and formed aluminum foil) as used in Example 11 was used. It was confirmed that the semiconductor layer was composed of lead dioxide and lead sulfate and the content of lead dioxide was about 5% by weight.

The results obtained in Examples 11 through 14 and Comparative Example 6 are shown in Table 4. For reference, also the results of Comparative Examples 4 and 5 are also shown in Table 4.

TABLE 4

|  | Capacitance (μF) | tan δ (%)[1] | Leak Current (μA)[2] | Size of capacitor[3] |
|---|---|---|---|---|
| Example 11 | 2.4 | 1.5 | 0.08 | 0.7 |
| Example 12 | 2.2 | 1.4 | 0.09 | 0.7 |
| Example 13 | 2.0 | 1.3 | 0.10 | 0.7 |
| Example 14 | 1.9 | 1.2 | 0.12 | 0.7 |
| Comparative Example 4 | 2.9 | 2.3 | 0.05 | 1 |
| Comparative Example 5 | 1.6 | 2.0 | 0.06 | 0.9 |
| Comparative Example 6 | 1.1 | 4.2 | 0.07 | 0.7 |

Note
[1] measured at 120 Hz
[2] measured at 20 V
[3] relative value calculated based on the size of the capacitor of Comparative Example 4 regarded as 1

EXAMPLE 15

The surface of an aluminum foil having a length of 8 cm and a width of 0.6 cm was electrochemically etched by an alternating current by using the aluminum foil as the positive electrode. A positive electrode terminal was caulked to the etched aluminum foil, and the etched aluminum foil was electrochemically treated in an aqueous solution of boric acid and ammonium borate to form a dielectric aluminum oxide layer whereby an etched and formed aluminum foil for a low voltage (about 3.0 μF/10 cm²) was obtained. Then, the formed aluminum foil was immersed, except the positive electrode terminal, in an aqueous solution containing 2.0 mole/l of lead acetate trihydrate and a dilute aqueous solution containing hydrogen peroxide in an amount of 0.5 mole per mole of lead acetate trihydrate was added. The aluminum foil was allowed to stand in this state for 1 hour to form a lead dioxide layer on the dielectric layer. The lead dioxide layer was washed with water and dried under a reduced pressure, and the obtained laminate was wound into the form of a roll to obtain a roll-form capacitor element. The capacitor element was immersed in a silver paste bath and a negative electrode terminal was attached to the silver paste. The capacitor element was sealed with a resin to obtain a roll type solid electrolytic capacitor.

EXAMPLE 16

The same etched and formed aluminum foil as used in Example 15 was immersed, except the positive electrode lead line, in an aqueous solution containing 1.5 mole/l of lead nitrate. The etched and formed aluminum foil was subjected to electrolytic oxidation at a constant current by using aluminum as the negative electrode to form a lead dioxide layer on the dielectric layer. The lead dioxide layer was washed with water and dried under a reduced pressure at 100° C. for 1 hour. The post treatment were carried out in the same manner as described in Example 15 to obtain a roll type solid electrolytic capacitor.

EXAMPLE 17

A roll type solid electrolytic capacitor having a semiconductor of manganese dioxide was prepared in the same manner as described in Example 15 except that manganese acetate was used instead of lead acetate trihydrate.

COMPARATIVE EXAMPLE 7

A roll type electrolytic capacitor was prepared in the same manner as described in Comparative Example 1 except that the size of the etched and formed aluminum foil was reduced.

COMPARATIVE EXAMPLE 8

A roll type electrolytic capacitor was prepared in the same manner as described in Comparative Example 2 except that the size of the etched and formed aluminum foil was reduced.

The results obtained in Examples 15 through 17 and Comparative Examples 7 and 8 are shown in Table 5.

TABLE 5

|  | Capacitance ($\mu F$) | tan δ (%)*1 | Size of capacitor*2 | ESR ($\Omega$)*3 |
|---|---|---|---|---|
| Example 15 | 1.9 | 1.6 | 0.7 | 11 |
| Example 16 | 1.5 | 2.0 | 0.7 | 18 |
| Example 17 | 1.6 | 2.1 | 0.7 | 17 |
| Comparative Example 7 | 2.7 | 2.2 | 1 | 11 |
| Comparative Example 8 | 1.4 | 2.1 | 0.9 | 20 |

Note
*1 measured at 120 Hz
*2 relative value calculated based on the size of the capacitor of Comparative Example 7 regarded as 1
*3 equivalent series resistance

EXAMPLE 18

The surface of an aluminum foil having a length of 8 cm and a width of 0.6 cm was electrochemically etched by an alternating current by using the aluminum foil as the positive electrode. A positive electrode terminal was caulked to the etched aluminum foil, and the etched aluminum foil was electrochemically treated in an aqueous solution of boric acid and ammonium borate to form a dielectric aluminum oxide layer and obtain an etched and formed aluminum foil for a low voltage (about 3.0 $\mu F/10$ cm$^2$).

A reaction mother liquid was prepared by mixing an aqueous solution containing 3.8 mole/l of lead acetate trihydrate with an aqueous solution containing 4.4 mole/l of ammonium persulfate, and the etched and formed aluminum foil was immersed, except the positive electrode terminal, in the reaction mother liquid and was allowed to stand at 80° C. for 20 minutes. The semiconductor layer precipitated on the dielectric layer was washed with water to remove the unreacted substances and dried under a reduced pressure at 100° C. for 1 hour. By mass analysis, X-ray analysis and infrared spectrum analysis, it was confirmed that the formed semiconductor layer was composed of lead dioxide and lead sulfate and the content of lead dioxide was about 25% by weight.

Then, the obtained laminate was wound into the form of a roll to form a roll-form capacitor element. The capacitor element was immersed in a silver paste bath, and a negative electrode terminal was attached onto the silver paste. The capacitor element was dried at 100° C. for 1 hour and was sealed with a resin to obtain a roll type solid electrolytic capacitor.

EXAMPLE 19

A roll type solid electrolytic capacitor was prepared in the same manner as described in Example 18 except that the concentration of ammonium persulfate was changed to 1.0 mole/l at the step of forming the semiconductor layer. It was confirmed that the semiconductor layer was composed of lead dioxide and lead sulfate and the content of lead dioxide was about 40% by weight.

EXAMPLE 20

A roll type solid electrolytic capacitor was prepared in the same manner as described in Example 18 except that aqueous hydrogen peroxide was further added at a concentration of 0.1 mole/l to the reaction mother liquid at the step of forming the semiconductor layer. It was confirmed that the semiconductor layer was composed of lead dioxide and lead sulfate and the content of lead dioxide was about 60% by weight.

EXAMPLE 21

A roll type solid electrolytic capacitor was prepared in the same manner as described in Example 18 except that aqueous hydrogen peroxide was further added at a concentration of 0.25 mole/l to the reaction mother liquid. It was confirmed that the semiconductor layer was composed of lead dioxide and lead sulfate and the content of lead dioxide was about 82% by weight.

COMPARATIVE EXAMPLE 9

A roll type electrolytic capacitor was prepared in the same manner as described in Comparative Example 1 except that the size of the etched and formed aluminum foil was reduced.

COMPARATIVE EXAMPLE 10

A roll type electrolytic capacitor was prepared in the same manner as described in Comparative Example 2 except that the size of the etched and formed aluminum foil was reduced.

COMPARATIVE EXAMPLE 11

A roll type solid electrolytic capacitor was prepared in the same manner as described in Example 18 except that an aqueous solution containing 0.6 mole/l of lead citrate was used instead of the aqueous solution containing 3.8 mole/l of lead acetate trihydrate and the concentration of ammonium persulfate was changed to 4.0 mole/l. It was confirmed that the semiconductor layer was composed of lead dioxide and lead sulfate and the content of lead dioxide was about 4% by weight.

The results obtained in Examples 18 through 21 and Comparative Examples 9 through 11 are shown in Table 6.

TABLE 6

|  | Capacitance ($\mu F$) | tan δ (%)*1 | Leak Current ($\mu A$)*2 | Size of capacitor*3 |
|---|---|---|---|---|
| Example 18 | 2.3 | 1.8 | 0.10 | 0.7 |
| Example 19 | 2.1 | 1.6 | 0.11 | 0.7 |
| Example 20 | 2.0 | 1.4 | 0.12 | 0.7 |
| Example 21 | 1.8 | 1.3 | 0.16 | 0.7 |
| Comparative Example 9 | 2.7 | 2.1 | 0.08 | 1.0 |
| Comparative Example 10 | 1.4 | 2.0 | 0.06 | 0.9 |
| Comparative Example 11 | 1.1 | 3.5 | 0.10 | 0.7 |

Note
*1 measured at 120 Hz
*2 measured at 20 V
*3 relative value calculated based on the size of the capacitor of Comparative Example 9 regarded as 1

EXAMPLE 22

The surface of an aluminum foil having a length of 10 cm and a width of 0.5 cm was electrochemically etched by an alternating current by using the aluminum foil as the positive electrode. A positive electrode terminal was caulked to the etched aluminum foil and a positive electrode lead line was connected thereto. Then, the etched aluminum foil was electrochemically treated in an aqueous solution of boric acid and ammonium borate to form an aluminum oxide layer and obtain an etched and formed aluminum foil for a low voltage (about 1.0 $\mu F/cm^2$). The formed foil was wound into a roll form together with a separator having a thickness of 10 $\mu m$ and composed of glass fibers, and re-formation was carried out in the above-mentioned aqueous solution of boric acid and ammonium borate. Subsequently, the roll-form foil was immersed in an aqueous solution containing 1 mole/l of lead acetate and a dilute aqueous solution containing hydrogen peroxide in an amount of 0.5 mole per mole of lead acetate was added. The roll-form foil was allowed to stand in this state for 1 hour. The lead dioxide layer precipitated on the roll-form foil was washed with water and dried under a reduced pressure at 120° C. The roll-form foil having the lead dioxide layer was immersed in a silver paste bath, drawn up and air-dried. The solidified silver paste layer was formed on the lead dioxide layer of the roll-form foil. A CP line was connected as the negative electrode lead to the roll-form foil by a silver paste and the surface was covered with a solder, and the roll-form foil was sealed with a resin to obtain a solid electrolytic capacitor.

EXAMPLE 23

An aqueous solution containing 3.8 mole/l of lead acetate trihydrate was mixed with an aqueous solution containing 4.0 mole/l of ammonium persulfate. The same etched and formed aluminum foil as used in Example 22 was wound into a roll form together with a separator having a thickness of 25 $\mu m$ and composed of rayon fibers, and the roll-form aluminum foil was immersed in the above-mentioned liquid mixture and allowed to stand at 90° C. for 20 minutes. The semiconductor layer precipitated on the roll-form aluminum foil was washed with water. The post treatments were carried out in the same manner as described in Example 22 to obtain a roll type solid electrolytic capacitor. By mass analysis, X-ray analysis and infrared spectrum analysis, it was confirmed that the formed semiconductor layer was composed of lead dioxide and lead sulfate and the content of lead dioxide was about 25% by weight.

EXAMPLE 24

A roll type solid electrolytic capacitor was prepared in the same manner as described in Example 23 except that aqueous hydrogen peroxide was added at a concentration of 0.05 mole/l at the step of forming the semiconductor layer. It was confirmed that the semiconductor layer was composed of lead dioxide and lead sulfate and the content of lead dioxide was about 50% by weight.

The results obtained in Examples 22 through 24 are shown in Table 7. For reference, the results obtained in Comparative Examples 1 and 2 are also shown in Table 7.

TABLE 7

|  | Capacitance ($\mu F$) | tan δ (%)[1] | Size of capacitor[2] |
|---|---|---|---|
| Example 22 | 6.4 | 6.8 | 0.8 |
| Example 23 | 6.7 | 7.4 | 0.8 |
| Example 24 | 6.5 | 7.0 | 0.8 |
| Comparative Example 1 | 9.8 | 15.1 | 1 |
| Comparative Example 2 | 5.8 | 10.2 | 0.9 |

Note
[1] measured at 120 Hz
[2] relative value calculated based on the size of the capacitor of Comparative Example 1 regarded as 1

EXAMPLE 25

A positive electrode was prepared according to the following procedures. The surface of a high-purity aluminum foil having a purity of 99.99% and a thickness of 80 $\mu m$ was etched by a direct current in an aqueous solution of hydrochloric acid and was water-washed and dried. The surface of the foil was oxidized by an anodic oxidation treatment in an aqueous solution of boric acid under application of a voltage of 70 V to form a dielectric oxide film layer. The foil was cut into a piece having a width of 6 mm and a length of 85 mm. An aluminum tab having a width of 2.5 mm, which had been subjected to the anodic oxidation treatment, was attached as an electrode terminal lead to a part of the aluminum foil by ultrasonic welding.

The same high-purity aluminum foil having a thickness of 50 $\mu m$ as described above was used for the negative electrode, and the foil was cut in the same size as that of the positive electrode foil.

A. Formation of Capacitor Shown in FIG. 3

The above-mentioned positive electrode foil in the unwound state was immersed in an aqueous solution containing 1 mole/l of lead acetate and 2 mole/l of ammonium persulfate, and the foil was removed from the aqueous solution and air-dried. This operation was repeated two times. Then, the foil was superposed upon the above-mentioned negative electrode foil, and the superposed assembly was wound into a roll from one end and the terminal end of the winding was secured by an adhesive resin tape to form a roll-form capacitor element. The capacitor element was first immersed in an aqueous solution containing 1 mole/l of lead acetate and 2 mole/l of ammonium persulfate and then air-dried, and this operation was repeated three times. The periphery of the capacitor element was covered with an electroconductive resin and a lead line was connected to the electroconductive resin layer, and the outer surface was covered and sealed with a silicone resin.

B. Formation of Capacitor Shown in FIG. 4

For comparison, a capacitor as shown in FIG. 4 was prepared according to the following procedures. The above-mentioned positive electrode foil was wound into a roll together with the negative electrode foil to form a roll-form capacitor element. The capacitor element was first immersed in an aqueous solution containing 1 mole/l of lead acetate and 2 mole/l of ammonium persulfate and then air-dried. This operation was repeated 5 times, and the capacitor was armored in the same manner as described above with respect to the capacitor A.

C. Formation of Capacitor Shown in FIG. 5

For comparison, a capacitor as shown in FIG. 5 was prepared according to the following procedures. The above-mentioned positive electrode foil in the unwound state was immersed in an aqueous solution containing 1 mole/l of lead acetate and 2 mole/l of ammonium persulfate, and the foil was removed from the aqueous solution and air-dried. This operation was repeated 3 times. The foil was piled with the above-mentioned negative electrode foil, and the assembly was wound into a roll from one end thereof and the terminal end of the winding was secured by an adhesive resin tape to form a roll-form capacitor element. In the same manner as described above with respect to the capacitor A, a negative electrode lead line was attached and the element was armored.

These capacitors A, B and C were aged for 8 hours under application of a voltage of 35 V, and the electric properties of these capacitors were determined and compared. The obtained results are shown in Table 8.

TABLE 8

|  | Capacitor A | Capacitor B | Capacitor C |
|---|---|---|---|
| Electrostatic capacitance (μF) | 16 | 12 | 15 |
| Loss (tan δ) (%) | 1.8 | 2.0 | 3.1 |
| Leak current (μA)* | 1.5 | 6.9 | 4.7 |

Note
*measured after a voltage of 25 V had been applied for 3 minutes

As is apparent from the foregoing results, the solid electrolytic capacitor A had a large electrostatic capacitance, a small loss (tan δ) and a small leak current as compared with the solid electrolytic capacitors B and C. It is deemed that this is because the solid electrolyte sufficiently permeated the interiors of the etching pits and a sufficient contact with the dielectric oxide layer was attained in the capacitor A.

EXAMPLE 26

A. Formation of Capacitor Shown in FIG. 6

A positive electrode was prepared in the same manner as described in Example 25. This positive electrode foil in the unwound state was immersed in an aqueous solution containing 1 mole/l of lead acetate and 2 mole/l of ammonium persulfate, and the foil was removed from the aqueous solution and air-dried. This operation was repeated two times. The foil was superposed with a glass fiber fabric having a thickness of 80 μm and cut in a width of 8 mm, and the superposed assembly was wound into a roll-form from one end thereof and the terminal end of the winding was secured by an adhesive resin tape to form a roll-form capacitor element.

The roll-form capacitor element was first immersed in an aqueous solution containing 1 mole/l of lead acetate and 2 mole/l of ammonium persulfate and then air-dried. This operation was repeated 3 times. The periphery of the capacitor element was covered with an electroconductive resin, and a lead line was connected to the electroconductive resin layer and the outer surface was covered and sealed with a silicone resin.

B. Formation of Comparative Capacitor

The above-mentioned positive electrode foil in the state where no lead dioxide layer was formed thereon was wound into a roll together with the above-mentioned separator in the same manner as described above to form a roll-form capacitor element.

The capacitor element was first immersed in an aqueous solution containing 1 mole/l of lead acetate and 2 mole/l of ammonium persulfate and then air-dried, and this operation was repeated 5 times. The capacitor element was armored in the same manner as described above.

The so-prepared capacitors were aged for 8 hours under application of a voltage of 35 V, and the electric properties of the capacitors were determined and compared. The results are shown in FIG. 9.

TABLE 9

|  | Capacitor A | Capacitor B |
|---|---|---|
| Electrostatic capacitance (μF) | 23.3 | 19.5 |
| Loss (tan δ) (%) | 1.9 | 4.5 |
| Leak current (μA)* | 0.9 | 2.5 |

Note
*measured after a voltage of 25 V had been applied for 3 minutes

As is apparent from the foregoing results, the solid electrolytic capacitor A had a large electrostatic capacitance as compared with the solid electrolytic capacitor B. It is deemed that this is because the solid electrolyte sufficiently permeated the interiors of the etching pits in the capacitor A.

We claim:

1. A roll type solid electrolytic capacitor comprising a capacitor element in the form of a roll which consists of a valve metal positive electrode substrate having a dielectric oxide layer on both of the entire surfaces thereof, a semiconductor layer formed on the entire surface of each dielectric oxide layer and an electroconductive layer formed on the entire surface of each semiconductor layer, said electroconductive layer being formed from at least one electroconductive paste selected from the group consisting of a silver paste, a copper paste, a nickel paste, an aluminum paste and a carbon paste.

2. A solid electrolytic capacitor as set forth in claim 1, wherein the capacitor element is in the form of a roll together with a separator.

3. A solid electrolytic capacitor as set forth in claim 1 or 2, wherein the dielectric oxide layer is a layer of an oxide of the valve metal as the positive electrode.

4. A solid electrolytic capacitor as set forth in claim 1, wherein the semiconductor layer is composed mainly of lead dioxide.

5. A solid electrolytic capacitor as set forth in claim 4, wherein the semiconductor layer composed mainly of lead dioxide is a layer electrochemically precipitated from a reaction mother liquid containing a lead-containing compound.

6. A solid electrolytic capacitor as set forth in claim 4, wherein the semiconductor layer composed mainly of lead dioxide is a layer chemically precipitated from a reaction mother liquid containing a lead-containing compound and an oxidant.

7. A solid electrolytic capacitor as set forth in claim 1, wherein the semiconductor layer is composed mainly of lead dioxide and lead sulfate.

8. A solid electrolytic capacitor as set forth in claim 7, wherein lead dioxide is contained in an amount larger than 10% by weight but smaller than 100% by weight in the semiconductor layer.

9. A solid electrolytic capacitor as set forth in claim 7, wherein the semiconductor layer composed mainly of lead dioxide and lead sulfate is a layer chemically precipitated from a reaction mother liquid containing a lead ion and a persulfate ion.

* * * * *

UNITED STATES PATENT AND TRADEMARK OFFICE
CERTIFICATE OF CORRECTION

PATENT NO. : 4,888,666

DATED : December 19, 1989

INVENTOR(S) : Kazumi Naitoh, Yoshiaki Arakawa, Takashi Ikezaki, Shoji Yabe, Yutaka Yokoyama, Yuichi Hamaguchi and Yasunobu Roppongi It is certified that error appears in the above-identified patent and that said Letters Patent is hereby corrected as shown below:

On the title page:

Please add the names of the following inventors:

Takashi Ikezaki of Atsugi, Japan
Shoji Yabe of Kawasaki, Japan
Yutaka Yokoyama of Fussa, Japan
Yuichi Hamaguchi of Oume, Japan
Yasunobu Roppongi of Oume, Japan Signed and Sealed this Fourth Day of June, 1991

*Attest:*

HARRY F. MANBECK, JR.

*Attesting Officer*   *Commissioner of Patents and Trademarks*